US009648598B2

(12) United States Patent
Takeda et al.

(10) Patent No.: US 9,648,598 B2
(45) Date of Patent: *May 9, 2017

(54) USER TERMINAL, RADIO COMMUNICATION METHOD AND RADIO COMMUNICATION SYSTEM

(71) Applicant: NTT DOCOMO, INC., Tokyo (JP)

(72) Inventors: Kazuaki Takeda, Tokyo (JP); Yang Lu, Beijing (CN); Qin Mu, Beijing (CN); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 14/399,974

(22) PCT Filed: May 9, 2013

(86) PCT No.: PCT/JP2013/063070
§ 371 (c)(1),
(2) Date: Nov. 10, 2014

(87) PCT Pub. No.: WO2013/168775
PCT Pub. Date: Nov. 14, 2013

(65) Prior Publication Data
US 2015/0146586 A1   May 28, 2015

(30) Foreign Application Priority Data
May 11, 2012 (JP) .................................. 2012-109983

(51) Int. Cl.
*H04W 72/04* (2009.01)
*H04L 1/18* (2006.01)
*H04L 5/14* (2006.01)

(52) U.S. Cl.
CPC .......... *H04W 72/0413* (2013.01); *H04L 1/18* (2013.01); *H04L 5/1469* (2013.01); *H04W 72/042* (2013.01)

(58) Field of Classification Search
CPC ... H04L 1/1854; H04L 1/1861; H04L 1/1887; H04L 1/1893; H04L 5/001; H04L 5/0055;
(Continued)

(56) References Cited

U.S. PATENT DOCUMENTS

| 2013/0155898 A1* | 6/2013 | Yin ....................... H04L 1/0026 370/254 |
| 2013/0208634 A1* | 8/2013 | Ji ........................ H04W 72/0406 370/280 |
| 2015/0103703 A1* | 4/2015 | Zeng ...................... H04L 5/001 370/280 |

OTHER PUBLICATIONS

International Search Report for corresponding International Application No. PCT/JP2013/063070, mailed Jul. 9, 2013 (1 page).
(Continued)

*Primary Examiner* — Pao Sinkantarakorn
(74) *Attorney, Agent, or Firm* — Osha Liang LLP

(57) ABSTRACT

The present invention is designed to allow effective allocation of PUCCH resources, even when the ratio between uplink subframes and downlink subframes is changed in each cell, in CA by TDD. A user terminal communicates with a radio base station by means of TDD, in a communication band that is broadbanded by CA between a first cell and a second cell, and has a receiving section that receives downlink control information for the first cell and downlink control information for the second cell, allocated to a downlink control channel of the first cell, a retransmission control determining section that determines retransmission control for downlink signals transmitted from each cell, a transmitting section that feeds back retransmission control signals to the radio base station using the PUCCH of the first
(Continued)

cell, and a resource selection section that selects the PUCCH resources to feed back the retransmission control signals, and, when the ratio of DL subframes is higher in the second cell than in the first cell, the resource selection section determines the PUCCH resources to allocate the retransmission control signals that correspond to the first cell and the second cell to, by different methods.

7 Claims, 14 Drawing Sheets

(58) Field of Classification Search
CPC ........... H04W 72/0413; H04W 72/042; H04W 72/1289
See application file for complete search history.

(56) References Cited

OTHER PUBLICATIONS

3GPP TS 36.213 V10.4.0; "3rd Generation Partnership Project; Technical Specification Group Radio Access Network; Evolved Universal Terrestrial Radio Access (E-UTRA); Physical layer procedures (Release 10);" Dec. 2011 (125 pages).

Renesas Mobile Europe; "Remaining issues on PDSCH HARQ for CC specific TDD configuration;" 3GPP TSG-RAN WG1 Meeting #68bis, R1-121379; Jeju, Korea; Mar. 26-30, 2012 (4 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

* cited by examiner

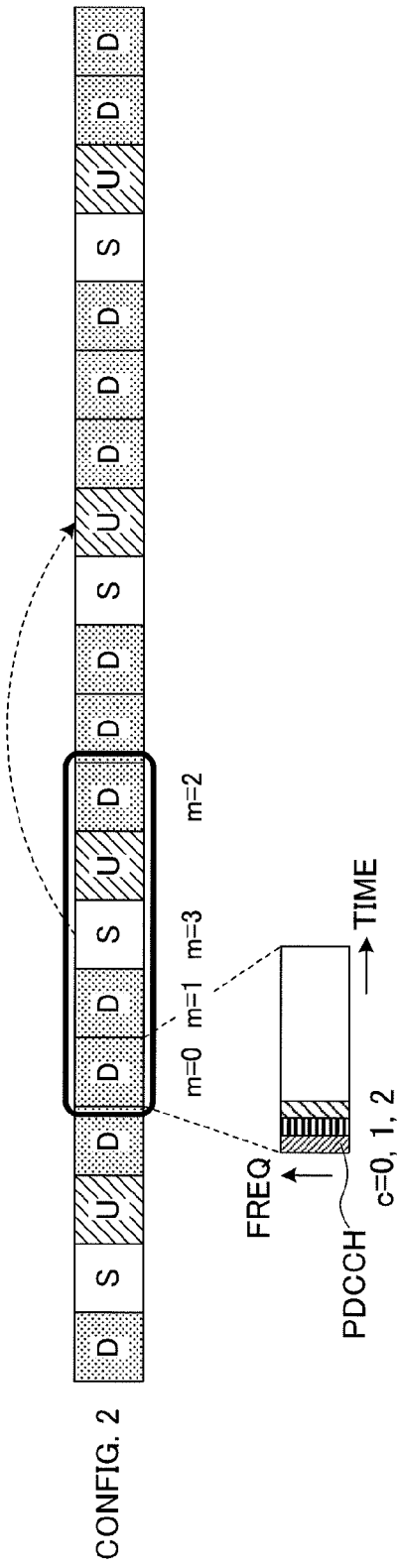
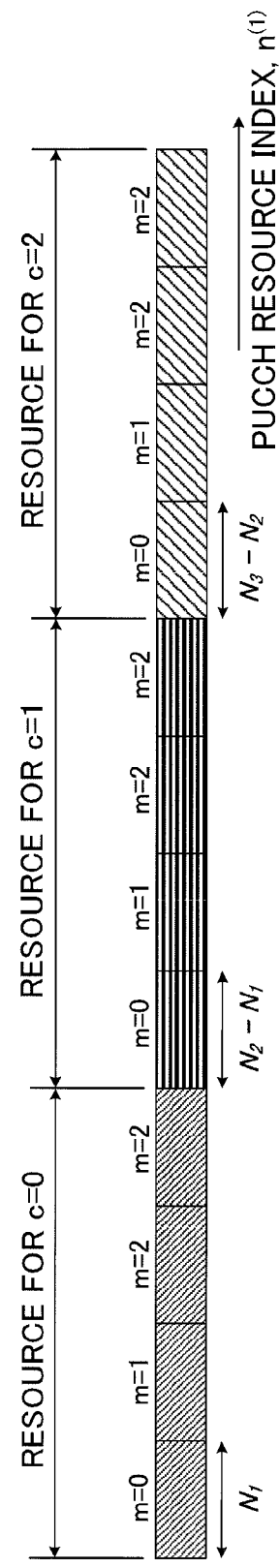
FIG.3A
FIG.3B

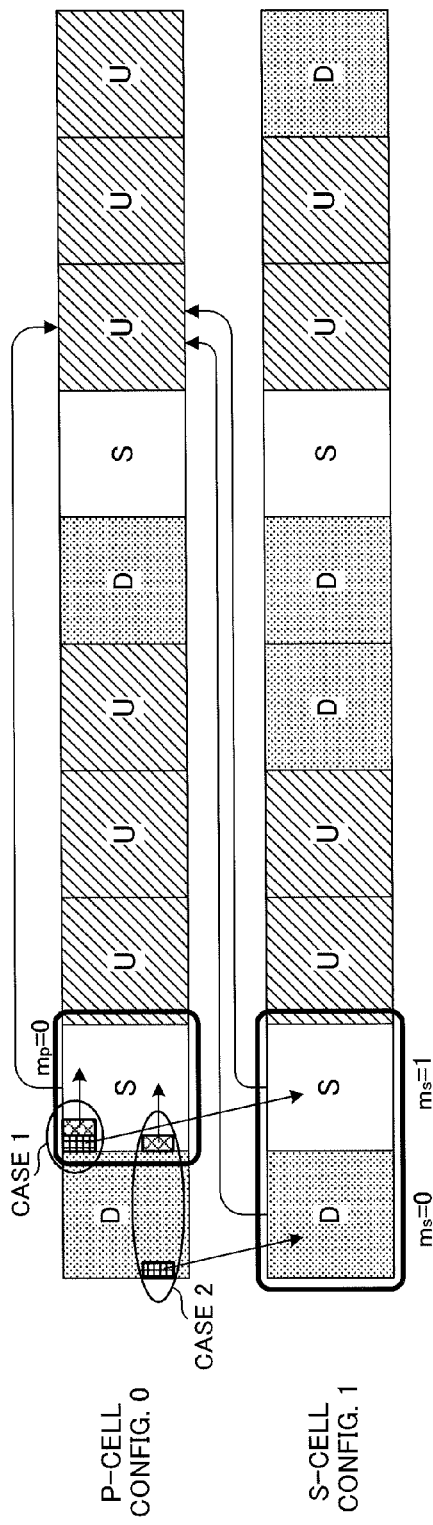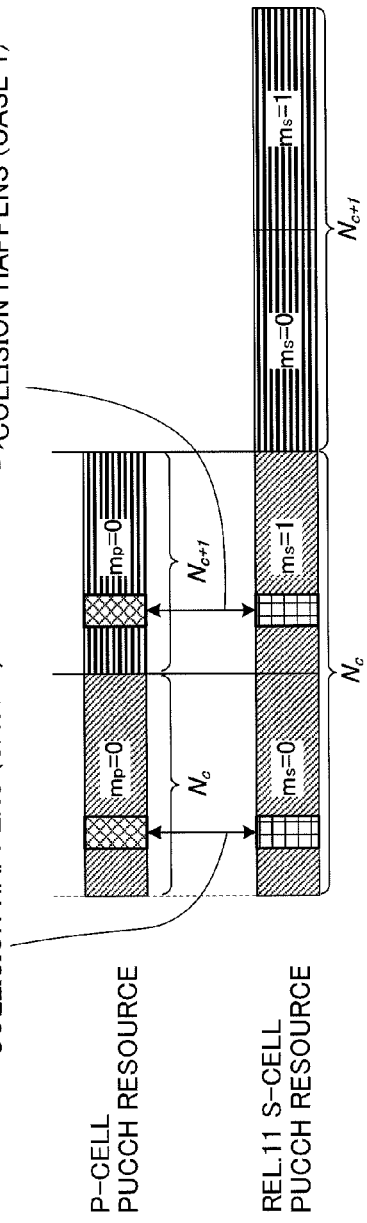
FIG.7A
FIG.7B

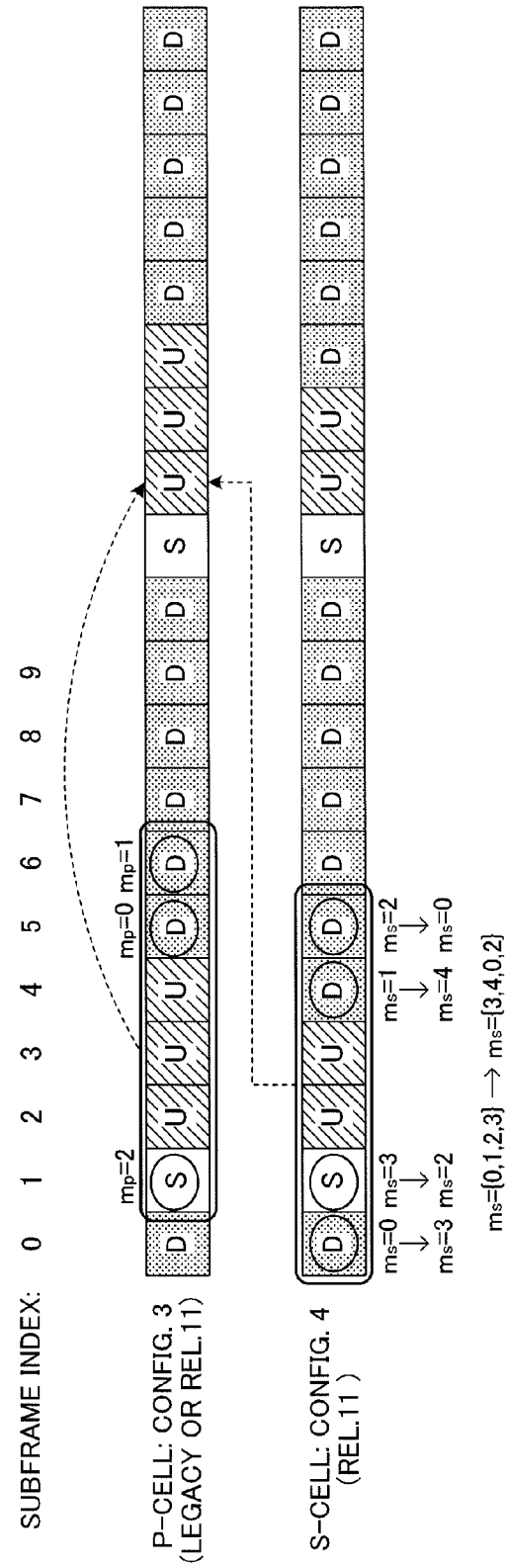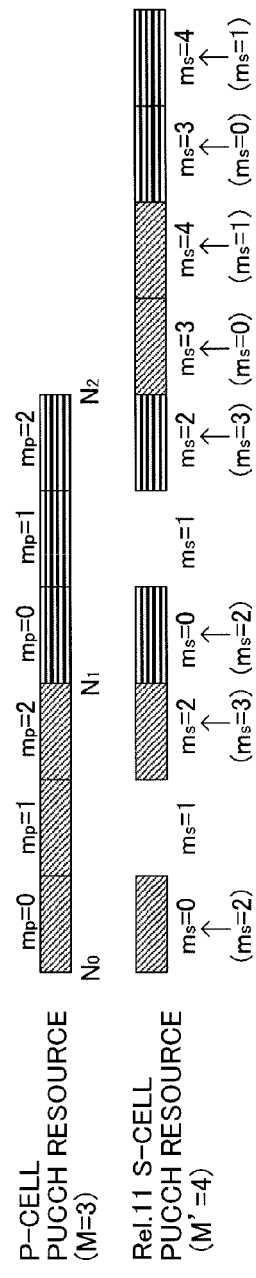

USER TERMINAL, RADIO COMMUNICATION METHOD AND RADIO COMMUNICATION SYSTEM

TECHNICAL FIELD

The present invention relates to a user terminal, a radio communication method and a radio communication system that are applicable to cellular systems and so on.

BACKGROUND ART

In a UMTS (Universal Mobile Telecommunications System) network, attempts are made to optimize features of the system, which are based on W-CDMA (Wideband-Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. In an LTE system, it is possible to achieve a transmission rate of about maximum 300 Mbps on the downlink and about 75 Mbps on the uplink by using a variable band which ranges from 1.4 MHz to 20 MHz. With the UMTS network, successor systems of LTE are also under study, for the purpose of achieving further broadbandization and higher speed (for example, LTE-advanced ("LTE-A")). The system band of an LTE-A system includes at least one component carrier (cell), where the system band of the LTE system is one unit. Gathering a plurality of components carriers (CCs) into a wide band in this way is referred to as "carrier aggregation" (CA).

In the uplink of the LTE-A system, application of SC-FDMA as a radio access scheme is under study. Consequently, a study is in progress to selectively transmit retransmission control information (ACK/NACK, and so on) corresponding to downlink signals (PDSCH signals) that are transmitted from a plurality of downlink CCs, respectively, from a single CC (for example, a P-Cell (Primary-Cell)), so as to maintain the characteristics of uplink single-carrier transmission. In this case, to feed back a plurality of retransmission control signals in response to the downlink signal of each CC, a user terminal needs to control the allocation of PUCCH resources. In Rel. 10 LTE, application of channel selection and so on, as allocation of PUCCH resources to retransmission control signals for two CCs is under study (non-patent literature 2).

In radio communication, as uplink and downlink duplexing methods, there are frequency division duplexing (FDD), which divides the uplink and the downlink by frequency, and time division duplexing (TDD), which divides the uplink and the downlink by time. In Rel. 10 LTE, when executing carrier aggregation in TDD, as shown in FIG. 1A, the ratio between uplink subframes and downlink subframes (Transmission Time Intervals: TTIs) is the same in all component carriers. In Rel. 11 LTE, considering application of a heterogeneous network and so on, as shown in FIG. 1B, changing the ratio between uplink subframes and downlink subframes in each component carrier when executing carrier aggregation in TDD is under study.

In the event carrier aggregation is applied, as shown in FIG. 2, for example, multiplexing and transmitting downlink control information (DCI 2) for a downlink shared channel to be transmitted by a component carrier CC 2 (an S-Cell (Secondary-Cell)), on a downlink control channel (PDCCH) of another component carrier CC 1 (P-Cell (Primary-Cell)), is under study (cross-carrier scheduling). When this takes place, a DCI configuration, in which a carrier indicator (CI) is added in order to identify for which component carrier's (between CC 1 and CC 2) downlink shared channel the downlink control information (DCI 2) provides information, is adopted.

CITATION LIST

Non-Patent Literature

Non-Patent Literature 1: 3GPP, TR25.912 (V7.1.0), "Feasibility Study for Evolved UTRA and UTRAN," September 2006

Non-Patent Literature 2: 3GPP, TR36.213 (V10.4.0), "Physical Layer Procedures," 2011-12

SUMMARY OF THE INVENTION

Technical Problem

In carrier aggregation in TDD, when the ratio between uplink subframes and downlink subframes is changed in each component carrier, cases might occur where, as shown in FIG. 1B, the number of downlink subframes of S-Cell becomes greater than the number of downlink subframes of P-Cell. If cross-carrier scheduling is applied under this circumstance, given that there are relatively few downlink subframes of P-Cell, subframes that are not scheduled by the PDCCH (Physical Downlink Control Channel) of P-Cell may be produced in S-Cell.

By applying cross-carrier scheduling between different subframes (that is, by allocating downlink control information for S-Cell to the PDCCHs of different P-Cell (cross-subframe scheduling)), it becomes possible to use all of the downlink subframes of S-Cell. In this case, a case might occur where the number of downlink subframes to feed back in predetermined uplink subframes of P-Cell varies between P-Cell and S-Cell. For example, cases may be expected where retransmission control signals corresponding to three downlink subframes are fed back from P-Cell and where retransmission control signals corresponding to four downlink subframes are fed back from S-Cell.

In this case, a user terminal needs to select resources so that the PUCCH resources to use to feed back retransmission control signals corresponding to the downlink signals of P-Cell and retransmission control signals corresponding to the downlink signals of S-Cell do not overlap each other.

The present invention has been made in view of the above, and it is therefore an object of the present invention to provide a user terminal, a radio communication method and a radio communication system, whereby, even when the ratio between uplink subframes and downlink subframes is changed on a per CC basis while CA is executed in TDD, it is still possible to allocate PUCCH resources to feedback information effectively.

Solution to Problem

The user terminal of the present invention is a user terminal that communicates with a radio base station by means of time division duplexing, in a communication band that is broadbanded by carrier aggregation, between a first cell and a second cell, and has a receiving section that receives each downlink control information for the first cell and the second cell, allocated to a downlink control channel of the first cell, by cross-carrier scheduling, a retransmission control determining section that determines retransmission control for downlink signals transmitted from each cell, and a transmitting section that feeds back retransmission control signals to the radio base station using an uplink control channel of the first cell, and a resource selection section that selects resources for the uplink control channel to feed back the retransmission control signals, and, when a ratio of downlink subframes is higher in the second cell than in the first cell, the resource selection section determines the resources for the uplink control channel to allocate the retransmission control signals corresponding to the downlink signals of the first cell to, and the resources for the uplink control channel to allocate the retransmission control signals corresponding to the downlink signals of the second cell to, by different methods, so that these resources are distributed.

Technical Advantage of the Invention

According to the present invention, even when the ratio between uplink subframes and downlink subframes is changed on a per CC basis while CA is executed in TDD, it is still possible to allocate PUCCH resources to feedback information effectively.

BRIEF DESCRIPTION OF THE DRAWINGS

FIG. 3 provides diagrams to explain an allocation method of PUCCH resources when, in TDD, retransmission control signals corresponding to downlink signals of a plurality of subframes are fed back;

FIG. 7 provides diagrams to explain a case where, when retransmission control signals corresponding to downlink signals of a plurality of subframes are fed back in TDD, PUCCH resources that are allocated to different retransmission control signals overlap;

FIG. 8 provides diagrams to explain examples of an allocation method of PUCCH resources according to the present embodiment;

DESCRIPTION OF EMBODIMENTS

Figures 1A, 1B:
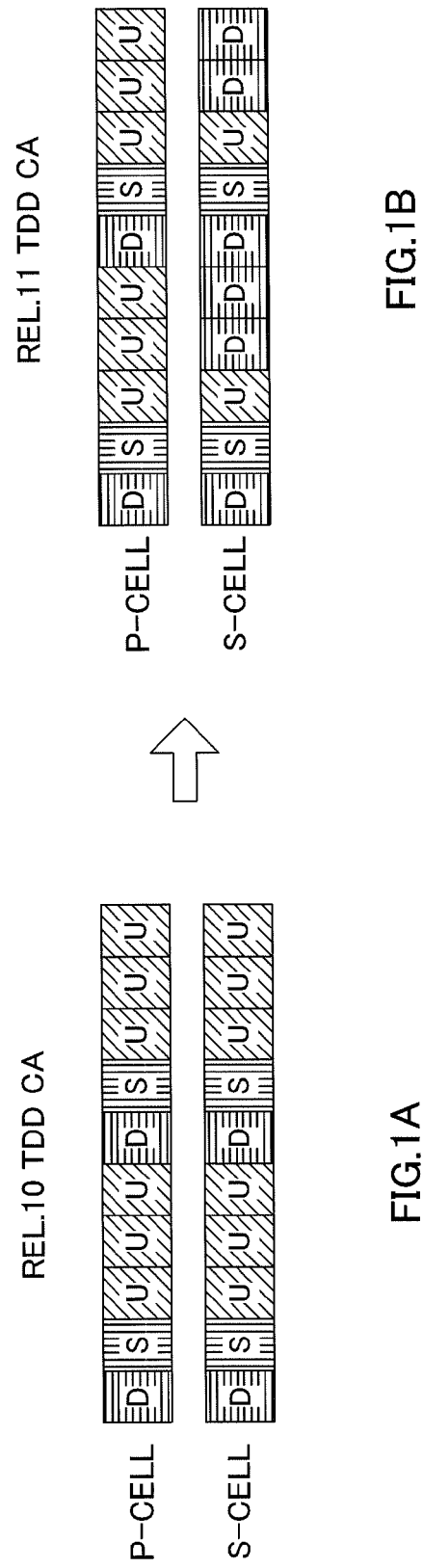
FIG. 1 provides diagrams to explain TDD carrier aggregation and subframe configurations in each cell.

First, in TDD, an allocation method of PUCCH resources upon feeding back retransmission control signals (ACK/NACK) corresponding to downlink signals (PDSCH signals) of a plurality of subframes via the PUCCH of a predetermined uplink subframe will be described with reference to FIG. 3.

FIG. 3A shows a radio frame configuration (configuration with consecutive subframes) in TDD (here, configuration 2 (hereinafter referred to as "Config. 2")). FIG. 3B shows a schematic diagram in which retransmission control signals to feed back from a plurality of subframes where the PDSCH is allocated are allocated to PUCCH resources of predetermined uplink subframes.

FIG. 3A shows a case where retransmission control signals corresponding to the downlink signals of the fifth to ninth downlink subframes from the left and a special subframes (which may be referred to as simply as "downlink subframes" hereinafter) are allocated to the PUCCH of the thirteenth subframe (UL) from the left and fed back. Note that the special subframe that comes seventh from the left has a guard interval, which is necessary when the uplink and the downlink are switched, and the PDSCH, the PUSCH and so on are allocated via this guard interval.

As shown in FIG. 3A, when retransmission control signals are fed back from a plurality of subframes, the PUCCH resources to be allocated to the retransmission control signals corresponding to downlink signals can be determined in accordance with following equation 1:

[Formula 1]

(Equation 1)

$$n^{(l)}_{PUCCH,m} = (M - m - 1) \times N_c + m \times N_{c+1} + n_{CCE,m} + N^{(l)}_{PUCCH},$$
$$= (N_{c+1} - N_c)m + (M - 1)N_c + n_{CCE,m} + N^{(l)}_{PUCCH}$$
$$m = 0 \sim M - 1$$
$$N_c = \max\{0, \lfloor [N^{DL}_{RB} \times (N^{RB}_{SC} \times c - 4)]/36 \rfloor\}$$

where:

c: a value selected from {0, 1, 2, 3} to fulfill $N_c \le n_{CCE,m} \le N_{c+1}$;

$N_{RB}^{DL}$: the number of resource blocks on the downlink;

$N_{SC}^{RB}$: the number of subcarriers per resource block in the frequency direction;

M: the number of subframes to feed back retransmission control signals;

m: the index of a subframe to feed back retransmission control signals; $n_{CCE,i}$: the first CCE index to constitute downlink control information; and $N_{(1)PUCCH}$: a parameter reported through higher layer signaling.

Here, the number of subframes to feed back retransmission control signals via UL subframes is 4 (M=4), so the indices m of these constituent subframes are m=0, 1, 2 and 3. In FIG. 3A, the indices m are assigned to the downlink subframes preferentially over the special subframe, so that the fifth subframe from the left is assigned m=0, the sixth subframe is assigned m=1, the seventh subframe is assigned m=3, and the ninth subframe is assigned m=2.

As shown in FIG. 3A, the PUCCH resources to be allocated to the retransmission control signals corresponding to the downlink signals of the fifth, sixth, seventh and ninth subframes from the left are determined based on the indices m of the subframes to feed back the retransmission control signals, the first control channel element (CCE) index $n_{cce}$, which provides the allocation unit of downlink control information, c (Nc to match the number of CCEs in c symbols) that corresponds to the number of PDCCH symbols, and so on.

In this way, when retransmission control signals are fed back via the PUCCH of predetermined UL subframes, it is possible to prevent the same PUCCH resources from being allocated to different retransmission control signals (PUCCH resource collision) by selecting the PUCCH resources to allocate to each retransmission control signal using above equation 1.

As noted earlier, in Rel. 10 and later versions, application of carrier aggregation is under study. In TDD, a study is in progress to apply channel selection based on PUCCH format 1b to up to two cells.

Figure 4:
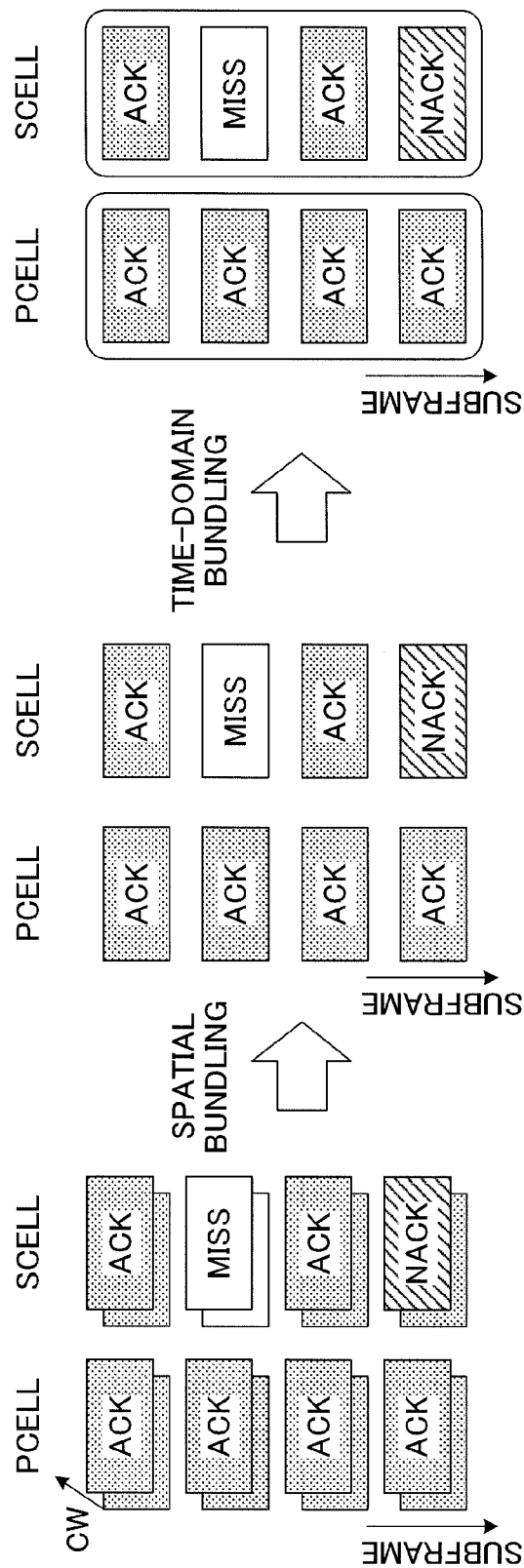
FIG. 4 is a diagram to explain allocation of PUCCH resources for retransmission control signals (ACK/NACK) upon carrier aggregation in TDD.

For example, FIG. 4 shows a case where, in two cells (P-Cell and S-Cell), retransmission control signals to correspond to the downlink signals of four subframes (M=4) are allocated to the PUCCH of predetermined UL subframes and fed back. When P-Cell and S-Cell both carry out 2-codeword transmission, by means of spatial bundling, when P-Cell and S-Cell both transmit an ACK, an ACK is sent out, and, when one of P-Cell and S-Cell transmits a NACK or a MISS, a NACK or a MISS is sent out. Then, by bundling these in the time domain (time-domain bundling), each cell's retransmission control information (ACK/NACK pattern) is represented with two bits.

The PUCCH resources (in this case, four of $n_{PUCCH,0}$ to $n_{PUCCH,3}$) to be allocated in channel selection when PUCCH format 1b is applied can be determined based on equation 1, as described above. When cross-carrier scheduling is executed between P-Cell and S-Cell, PUCCH resources can be determined based on information about subframes corresponding to predetermined DAI indices.

Figure 5:
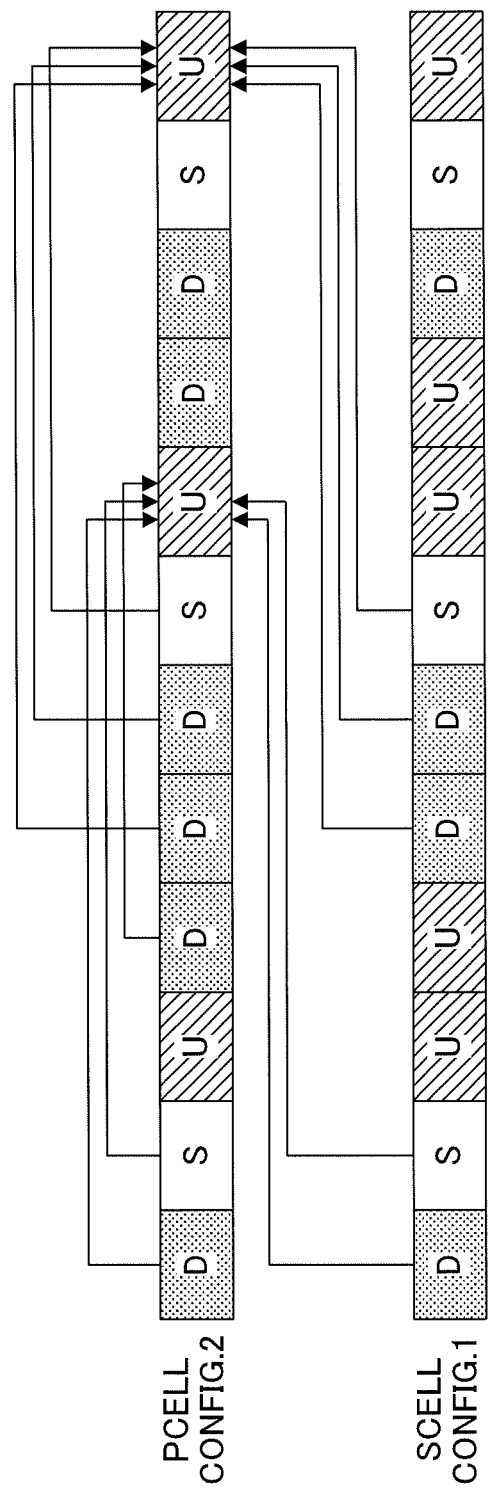
FIG. 5 is a diagram to explain an example of a subframe configuration of each cell upon carrier aggregation in TDD.

As noted above, in Rel. 11 and later versions, a study is in progress to change the ratio between uplink subframes and downlink subframes in each component carrier. For example, when, as shown in FIG. 5, P-Cell adopts Config. 2 of TDD and S-Cell adopts Config. 1 of TDD, the retransmission control signals in each subframe of S-Cell are fed back using PUCCH resource of UL subframes of P-Cell.

Figure 2:
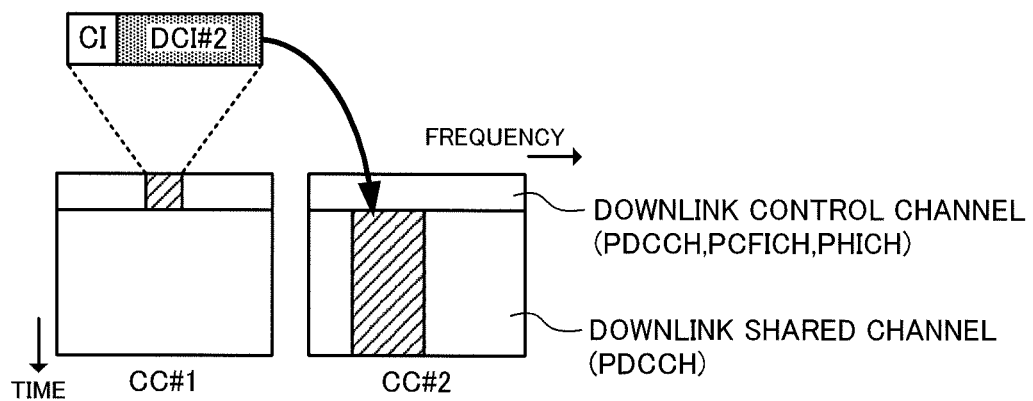
FIG. 2 is a diagram to explain cross-carrier scheduling.

When this takes places, as shown above with FIG. 2, it is possible to multiplex and transmit downlink control information for demodulating the downlink signals to be transmitted in S-Cell upon the PDCCHs of P-Cell (cross-carrier scheduling). In the case of FIG. 5, downlink control information for demodulating the downlink signals allocated to the first, second, fifth, sixth, seventh, tenth and eleventh subframes of S-Cell from the left is allocated to the PDCCHs of matching subframes of P-Cell in the time axis direction.

Figure 6A:
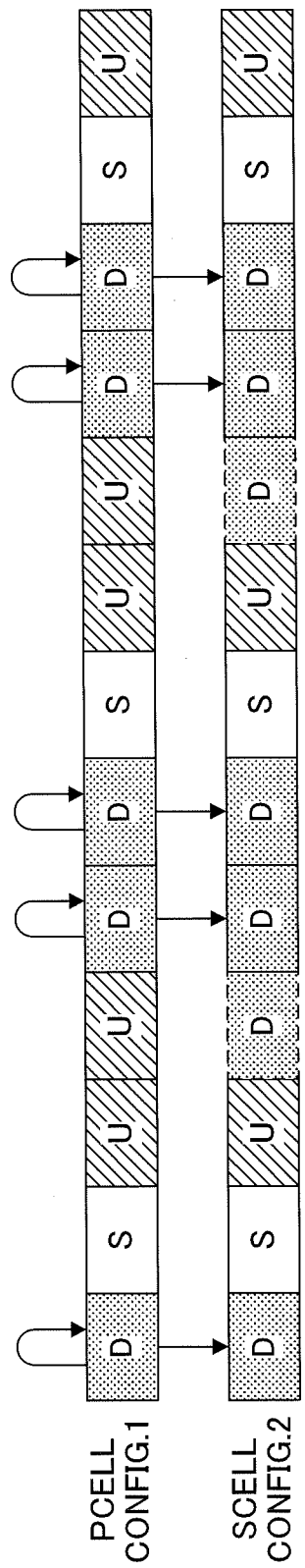
FIG. 6 provides diagrams to explain a subframe configuration of each cell upon carrier aggregation in TDD, and cross-carrier scheduling.

As shown in FIG. 6, when P-Cell adopts Config. 1 of TDD and S-Cell adopts Config. 2 of TDD, in one frame, the number of downlink subframes in S-Cell becomes greater than the number of downlink subframes in P-Cell. Consequently, when cross-carrier scheduling is applied using the PDCCHs of matching subframes of P-Cell in the time axis direction, cases might occur where S-Cell downlink subframes cannot be scheduled (see FIG. 6A). In FIG. 6A, it is not possible to use the fourth and ninth S-Cell downlink subframes from the left.

Figure 6B:
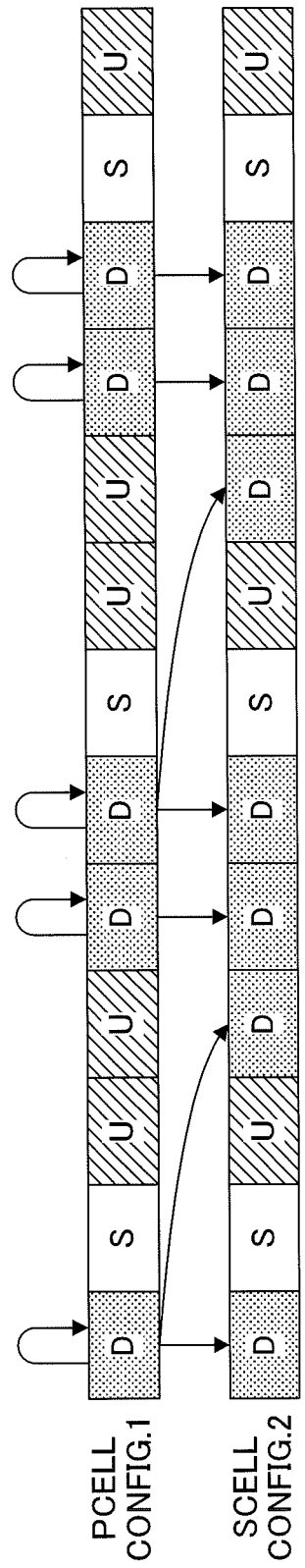

It may be possible to allocate downlink control information for S-Cell to the PDCCHs of unmatching downlink subframes of P-Cell in the time axis direction and execute cross-carrier scheduling (cross-subframe scheduling) (see FIG. 6B). In FIG. 6B, downlink control information for demodulating the downlink signals allocated to the fourth and ninth S-Cell subframes from the left is allocated respectively to the PDCCHs of the first and sixth downlink subframes of P-Cell from the left. This makes it possible to use downlink subframes that are present only in S-Cell (subframes where corresponding P-Cell subframes are uplink subframes), and improve throughput.

However, the present inventors have found out that, when downlink control information for S-Cell is allocated to the PDCCHs of P-Cell that do not match in the time axis direction, as shown in FIG. 6B, the number of subframes M to feed back retransmission control signals varies between P-Cell and S-Cell, and therefore a problem arises that the PUCCH resources to allocate the retransmission control signals for P-Cell and S-Cell to overlap.

FIG. 7 shows radio frame configurations (FIG. 7A) in the event P-Cell adopts Config. 0 of TDD and S-Cell adopts Config. 1 of TDD, and a schematic diagram (FIG. 7B) in which retransmission control signals corresponding to the downlink signals of a plurality of subframes are allocated to PUCCH resources in predetermined uplink subframes of P-Cell.

FIG. 7 shows a case where a retransmission control signal to correspond to the downlink signal of the second P-Cell subframe from the left is allocated to the PUCCH resource of the eighth P-Cell uplink subframe from the left and fed back. A case is also shown here where retransmission control signals corresponding to the downlink signals of the first and second subframes of S-Cell from the left are allocated to the PUCCH resource of the eighth uplink subframe of P-Cell from the left and fed back. The times to feed back retransmission control information in S-Cell come at the times of uplink subframes in that S-Cell.

That is to say, the number of subframes to feed back retransmission control signals in P-Cell is one (M=1), and the number of subframes to feed back retransmission control signals in S-Cell is two (M=2). In this case, the second subframe of P-Cell from the left is $m_p$=0, the first subframe of S-Cell from the left is $m_S$=0, and the second subframe is $m_S$=1.

In FIG. 7, cross-carrier scheduling is applied, and downlink control information for the first subframe of S-Cell from the left is allocated to the PDCCH of the first subframe of P-Cell from the left. Downlink control information for the second subframe of S-Cell from the left is allocated to the PDCCH of the second subframe of P-Cell from the left.

In this case, when above equation 1 is applied to determine the PUCCH resources to allocate to the retransmission control information corresponding to the downlink signals of each subframe, there is a threat that the PUCCH resources to allocate the retransmission control signals for P-Cell to and the PUCCH resources to allocate the retransmission control signals for S-Cell to might overlap (that is, PUCCH resources collide). This occurs when the number of subframes to feed back varies between P-Cell and S-Cell, and therefore Nc varies between P-Cell and S-Cell (case 1), and when downlink control information allocated to P-Cell and S-Cell subframes of the same subframe indices is assigned the same CCE indices (case 2).

In case 1, the subframe indices m for P-Cell and S-Cell allocated to subframes that match each other in the time axis direction (each being the second subframe from the left) and the CCE indices are different, and Nc varies between P-Cell and S-Cell. Consequently, a case might occur where PUCCH resources to allocate retransmission control signals for P-Cell to and PUCCH resources to allocate retransmission control signals for S-Cell to collide (see FIG. 7B).

In case 2, m becomes the same between P-Cell and S-Cell subframes that do not match each other in the time axis direction, and, furthermore, these subframes are assigned varying CCE indices, so that a case might occur where the PUCCH resources to allocate retransmission control signals for P-Cell to and the PUCCH resource to allocate retransmission control signals for S-Cell to collide (see FIG. 7B).

The present inventors have found out that, when the ratio of downlink subframes is higher in a second cell than in a first cell, if the PUCCH resources to allocate to retransmission control signals corresponding to the downlink signals of P-Cell and S-Cell are determined by the same method (for example, by above equation 1), the PUCCH resources to allocate the retransmission control signals to overlap between P-Cell and S-Cell.

So, the present inventors have found out that, when the ratio of downlink subframes is higher in the second cell than in the first cell, by determining the PUCCH resources to allocate the retransmission control signals corresponding to the downlink signals for P-Cell to, and the PUCCH resources to allocate the retransmission control signals corresponding to the downlink signals for S-Cell to, by respectively different methods, it is possible to distribute the PUCCH resources to allocate the retransmission control signals to between P-Cell and S-Cell, and therefore prevent them from overlapping each other.

To be more specific, the present inventors have found out that it is possible to effectively prevent the PUCCH resources to allocate different retransmission control signals to from overlapping each other, by controlling the indices m of the subframes to feed back retransmission control signals from S-Cell, taking into account the subframe indices of P-Cell.

The present inventors have furthermore found out that the PUCCH resources to allocate retransmission control signals corresponding to the downlink signals of P-Cell to, and the PUCCH resources to allocate retransmission control signals corresponding to the downlink signals of S-Cell to, to be controlled such that they can be selected respectively from different resource regions. The present embodiment will be described below in detail with reference to the accompanying drawings.

First Example

A case to control the indices m of subframes to feed back retransmission control signals from S-Cell will be described with the first example. FIG. 8 shows a case where P-Cell and S-Cell adopt different subframe configurations (that is, a case where there are more downlink subframes in S-Cell than in P-Cell). FIG. 8A shows the radio frame configurations of P-Cell and S-Cell in TDD, and FIG. 8B shows a schematic diagram in which retransmission control signals corresponding to the downlink signals of P-Cell and S-Cell are allocated to the PUCCHs of predetermined uplink subframes of P-Cell.

Note that, although FIG. 8 shows a case, as an example, where P-Cell adopts Config. 3 of TDD and S-Cell adopts Config. 4 of TDD, the radio frame configurations with the present embodiment are by no means limited to these. When P-Cell and S-Cell assume different subframe configurations, it is possible to apply various configurations in combinations.

FIG. 8A shows a case where, in P-Cell, retransmission control signals to correspond to the downlink signals of the second, sixth, and seventh subframes (subframe indices: 1, 5 and 6) from the left are allocated to the PUCCH resource of the thirteenth subframe of P-Cell from the left and fed back. In S-Cell, retransmission control signals to correspond to the downlink signals of the first, second, fifth, and sixth subframes (subframe indices: 0, 1, 4 and 5) from the left are allocated to the PUCCH resource of the thirteenth subframe of P-Cell from the left and fed back.

In FIG. 8A, the number of subframes to feed back retransmission control signals in P-Cell is three (M=3), and the number of subframes to feed back retransmission control signals in S-Cell is four (M'=4). In this case, the second subframe of P-Cell from the left is $m_p=2$, the sixth subframe is $m_p=0$, and the seventh subframe is $m_p=1$.

Regarding S-Cell, too, when subframe indices m are assigned by the same method as with P-Cell, the first subframe of S-Cell from the left is $m_S=0$, the second subframe is $m_S=3$, the fifth subframe is $m_S=1$, and the sixth subframe is $m_S=2$. Note that although the subframe indices m are assigned preferentially from downlink subframes, this is by no means limiting.

In FIG. 8, downlink control information for demodulating the downlink signals transmitted in S-Cell is multiplexed and transmitted on the PDCCH of P-Cell. In the case of FIG. 8, downlink control information for demodulating the downlink signals allocated to the first, second, and sixth subframes of S-Cell from the left is allocated to the PDCCHs in P-Cell subframes that match in the time axis direction. Downlink control information for demodulating the downlink signals allocated to the fifth subframe of S-Cell from the left can be allocated to the PDCCH in the second subframe of P-Cell from the left.

When above equation 1 is applied based on subframe indices m numbered as described above and so on, there is a threat that the PUCCH resources to allocate retransmission control signals to overlap (collide) between P-Cell and S-Cell, as shown in above FIG. 7.

Consequently, with the first example, the subframe indices $m_S$ of S-Cell are numbered taking into account the subframe indices $m_p$ of P-Cell, so as to prevent the PUCCH resources to be allocated to retransmission control signals respectively corresponding to downlink signals in P-Cell and S-Cell from overlapping each other. To be more specific, a user terminal controls (numbers) the index $m_S$ of each subframe to feed back retransmission control signals from S-Cell to fulfill the following requirements.

<Requirement 1>

When a downlink signal (PDSCH) is present in both P-Cell and S-Cell, the subframe indices $m_S$ in S-Cell are made the same as the subframe indices $m_p$ in P-Cell. Along the time axis direction, in subframes in which downlink signals are transmitted from both P-Cell and S-Cell, P-Cell's subframe indices $m_p$ and S-Cell's subframe indices $m_S$ are made the same.

For example, in FIG. 8A, among subframes of P-Cell and S-Cell to feed back retransmission control signals, the subframes in which downlink signals are transmitted in both P-Cell and S-Cell are the second and sixth subframes from the left. Consequently, in the second and sixth subframes from the left, the subframe indices $m_S$ for S-Cell are numbered to be the same as the subframe indices $m_p$ for P-Cell.

To be more specific, the index of the second subframe for S-Cell from the left is changed from "$m_S=3$" to "$=2$" ($m_S=3$ 2), and the index of the sixth subframe is changed from "$m_S=2$" to "$m_S=0$" ($m_S=2\rightarrow 0$).

In this way, when downlink signals are present in both P-Cell and S-Cell, the subframe indices $m_S$ for S-Cell are made the same as the subframe indices $m_p$ for P-Cell, so that it is possible to prevent collisions of PUCCH resources between different cells.

<Requirement 2>

When a downlink signal (PDSCH) is present only in S-Cell (when P-Cell is involved with the uplink), the subframe indices $m_S$ of that S-Cell are assigned indices that do not overlap with the indices $m_p$ assigned to the subframes of P-Cell. It is possible to carry out the numbering with indices that are not present in the subframe indices $m_p$ of P-Cell (here, integers from 3 onward) from a small index (here, from 3).

For example, in FIG. 8A, among the subframes of P-Cell and S-Cell to feed back retransmission control signals, the subframes to transmit downlink signals that are present only in S-Cell are the first and fifth subframes from the left. Consequently, in the first and fifth subframes from the left, the subframe indices $m_S$ of S-Cell are changed to indices that do no overlap with the subframe indices $m_p$ of P-Cell. To be more specific, the index of the first subframe for S-Cell from the left is changed from "$m_S=0$" to "$m_S=3$" ($m_S=0\rightarrow 3$), and the index of the fifth subframe is changed from "$m_S=1$" to "$m_S=4$" ($m_S=1\rightarrow 4$).

In this way, by numbering the indices of subframes that transmit downlink signals only from S-Cell, with indices that do not overlap with the subframe indices $m_p$ of P-Cell, it is possible to prevent collisions of PUCCH resources between different cells.

<Other Requirements>

Other requirements include not assigning—that is, skipping—subframe indices $m_S$ when there are subframes that do not transmit downlink signals in S-Cell (when these are uplink subframes).

After having set the subframe indices $m_S$ of S-Cell based on the above-described requirements, a user terminal is able to determine the PUCCH resources to allocate retransmission control signals corresponding to the downlink signals of S-Cell using following equation 2:

$n_{CCE,m}$: the first CCE index to constitute downlink control information;

$N^{(1)}_{PUCCH}$: a parameter reported through higher layer signaling; and $N_4$: the value given by substituting c=4 in the above equation to determine Nc.

As described above, even when the ratio of downlink subframes is higher in the second cell than in the first cell, it is possible to effectively prevent the PUCCH resources to allocate different retransmission control signals to from overlapping each other, by controlling the indices m of the subframes to feed back retransmission control signals from S-Cell, taking into account the subframe indices of P-Cell.

Second Example

Figure 9:
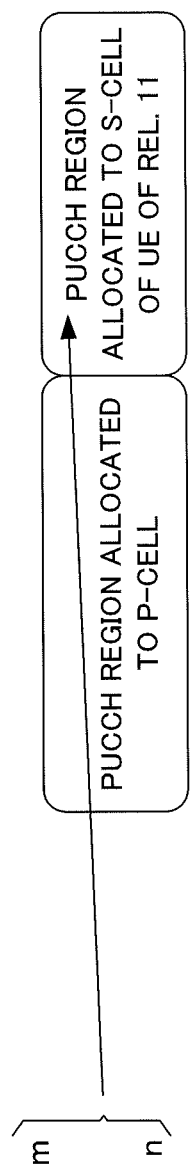
FIG. 9 is a diagram to explain another example of an allocation method of PUCCH resources according to the present embodiment.

With a second example, the PUCCH resources to allocate retransmission control signals corresponding to the downlink signals of P-Cell to, and the PUCCH resources to allocate retransmission control signals corresponding to the downlink signals of S-Cell to, are controlled such that they can be selected from different resource regions (see FIG. 9).

For example, the PUCCH resources to allocate retransmission control signals from P-Cell to are selected from the resource range represented in above equation 1, and the PUCCH resources to allocate retransmission control signals from S-Cell to, are selected from resource range at a shift from a range, the shift being at least greater than a maximum value of CCEs, which provide the allocation unit of downlink control information.

To be more specific, a user terminal selects the PUCCH resources to allocate retransmission control signals from S-Cell to, from a region at a shift from a range where the PUCCH resources to allocate retransmission control signals from P-Cell to are selected from, the shift being at least greater than a maximum value of control channel elements (CCEs), which provide an allocation unit of downlink control information.

In this case, the user terminal is able to determine the PUCCH resources to allocate retransmission control signals corresponding to downlink signals for S-Cell, using following equation 3:

[Formula 2]

$$n^{(l)}_{PUCCH,i} = \begin{cases} (M_{PCell}-m-1)\cdot N_c + m\cdot N_{c+1} + n_{CCE,m} + N^{(l)}_{PUCCH} & \text{if } m < M_{PCell} \\ (M_{SCell}-(m-M_{PCell})-1)\cdot N_c + (m-M_{PCell})\cdot N_{c+1} + n_{CCE,m} + N^{(l)}_{PUCCH} + M_{PCell}N_4 & \text{if } m \geq M_{PCel} \end{cases}$$
$$N_c = \max\{0, \lfloor [N^{DL}_{RB} \times (N^{RB}_{SC} \times c - 4)]/36 \rfloor\}$$

(Equation 2)

where:
c: a value selected from {0, 1, 2, 3} to fulfill $N_c \leq n_{CCE,m} \leq N_{c+1}$;
$N^{DL}_{RB}$: the number of resource blocks on the downlink;
$N^{RB}_{SC}$: the number of subcarriers per resource block in the frequency direction;
$M_{PCell}$: the number of subframes to feed back retransmission control signals from P-Cell;
$M_{SCell}$: the number of subframes to feed back retransmission control signals from S-Cell;
m: the index of a subframe to feed back retransmission control signals;

[Formula 3]

$$n^{(l)}_{PUCCH,i} =$$
$$(M_{SCell}-m-1)\times N_c + m\times N_{c+1} + n_{CCE,m} + N^{(l)}_{PUCCH} + \Delta,$$
$$\Delta > n^{(l)}_{PUCCH\_max} = M_{PCell}\cdot N_4 + N^{(l)}_{PUCCH}$$
$$N_c = \max\{0, \lfloor [N^{DL}_{RB} \times (N^{RB}_{SC} \times c - 4)]/36 \rfloor\}$$

(Equation 3)

where:

c: a value selected from {0, 1, 2, 3} to fulfill;

$N_{RB}^{DL}$: the number of resource blocks on the downlink;

$N_{SC}^{RB}$: the number of subcarriers per resource block in the frequency direction;

$M_{PCell}$: the number of subframes to feed back retransmission control signals from P-Cell;

$M_{SCell}$: the number of subframes to feed back retransmission control signals from S-Cell;

m: the index of a subframe to feed back retransmission control signals;

$n_{CCE,m}$: the first CCE index to constitute downlink control information;

$N^{(1)}_{PUCCH}$: parameter reported through higher layer signaling; and $N_4$: the value given by substituting c=4 in the above equation to determine Nc.

In this way, even when the ratio of downlink subframes is higher in the second cell than in the first cell, it is still possible to effectively prevent the PUCCH resources to allocate retransmission control signals to from overlapping each other between P-Cell and S-Cell, by selecting the PUCCH resources to allocate retransmission control signals corresponding to the downlink signals of P-Cell to and the PUCCH resources to allocate retransmission control signals corresponding to the downlink signals of S-Cell to, from different resource regions.

(Radio Communication System)

Figure 10:
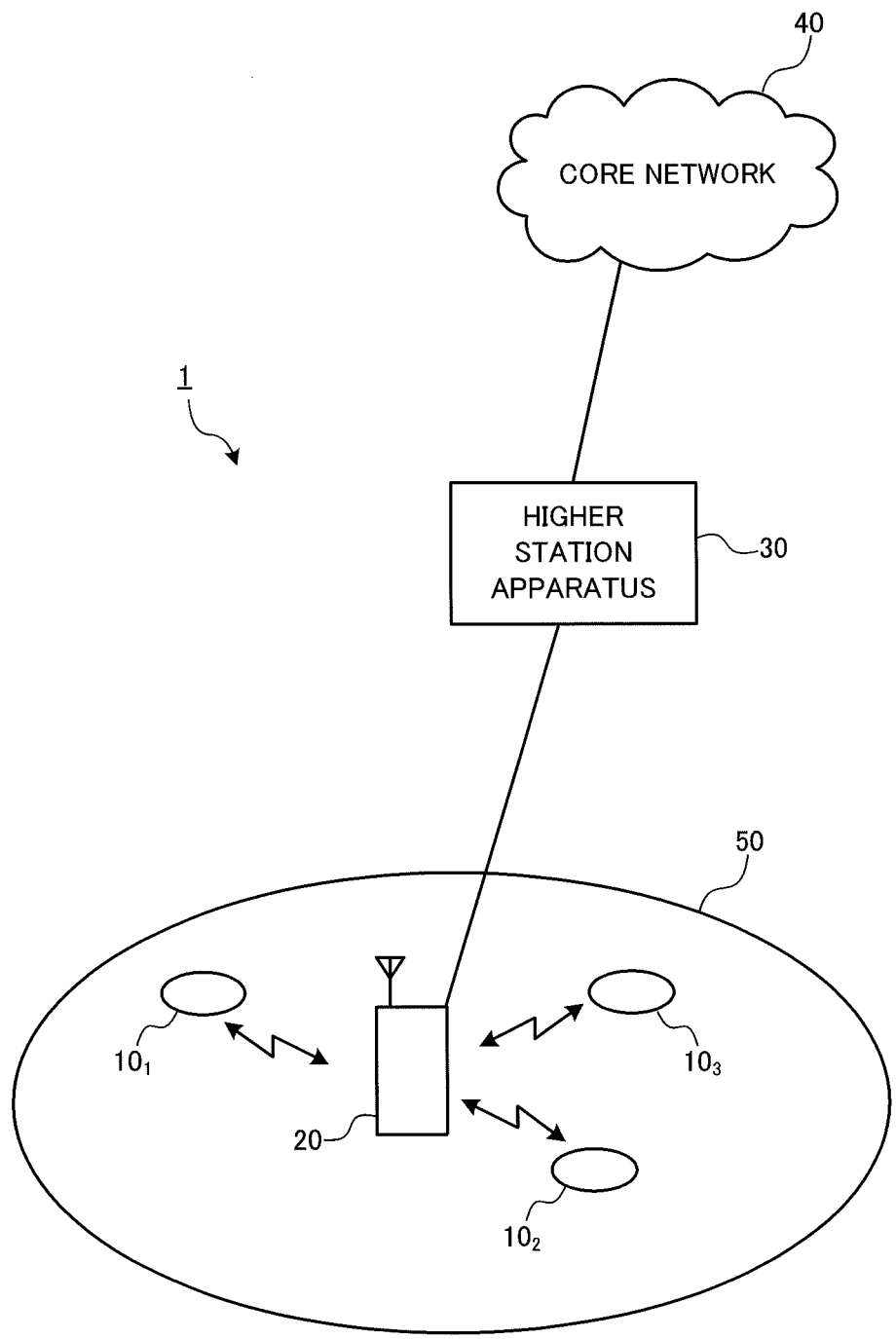
FIG. 10 is a diagram to explain a system configuration of a radio communication system.

A radio communication system according to the present embodiment will be described in detail. FIG. 10 is a diagram to explain a system configuration of a radio communication system according to the present embodiment. Note that the radio communication system shown in FIG. 10 is a system to accommodate, for example, the LTE system or SUPER 3G. In this radio communication system, carrier aggregation to group a plurality of fundamental frequency blocks into one, where the system band of the LTE system is one unit, is used. This radio communication system may be referred to as "IMT-Advanced" or may be referred to as "4G."

As shown in FIG. 10, a radio communication system 1 is configured to include a radio base station 20, and a plurality of user terminals $10_1$, $10_2$ and $10_3$ that communicate with this radio base station 20. This radio communication system 1 allows radio communication between the radio base station and user terminals by time division duplexing, and achieves broadbandization by carrier aggregation. In the radio communication system 1, even when a configuration is employed in which there are fewer downlink subframes in P-cell than the downlink subframes in S-cell, victim subframes in S-cell are scheduled in S subframes in P-cell.

The radio base station 20 is connected with a higher station apparatus 30, and this higher station apparatus 30 is connected with a core network 40. Radio base stations 20 are connected with each other by wire connection or by wireless connection. The user terminals $10_1$, $10_2$ and $10_3$ can communicate with the radio base station 20 in a cell 50. Note that the higher station apparatus 30 includes, for example, an access gateway apparatus, a radio network controller (RNC), a mobility management entity (MME) and so on, but is by no means limited to these.

The user terminals $10_1$, $10_2$ and $10_3$ include both LTE terminals and LTE-A terminals. Although the user terminals $10_1$, $10_2$ and $10_3$ will be described to perform radio communication with the radio base station 20 for ease of explanation, more generally, user equipment (UE), which may include both user terminals and fixed terminal apparatuses, may also be used as well.

For radio access schemes, in the radio communication system 1, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing the system band into bands formed with one or continuous resource blocks per terminal, and allowing a plurality of terminals to use mutually different bands.

Downlink communication channels include a PDSCH, which is used by the user terminals $10_1$, $10_2$, and $10_3$ on a shared basis as a downlink data channel, and downlink L1/L2 control channels (PDCCH, PCFICH, and PHICH). Transmission data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). ACK and NACK of HARQ (retransmission control signals) for the PUSCH are transmitted by the PHICH (Physical Hybrid-ARQ Indicator Channel).

Uplink communication channels include a PUSCH (Physical Uplink Shared Channel), which is used by each user terminal on a shared basis as an uplink data channel, and a PUCCH (Physical Uplink Control Channel), which is an uplink control channel. By means of this PUSCH, transmission data and higher control information are transmitted. The PUCCH transmits downlink received quality information (CQI), ACK/NACK, and so on.

Figure 11:
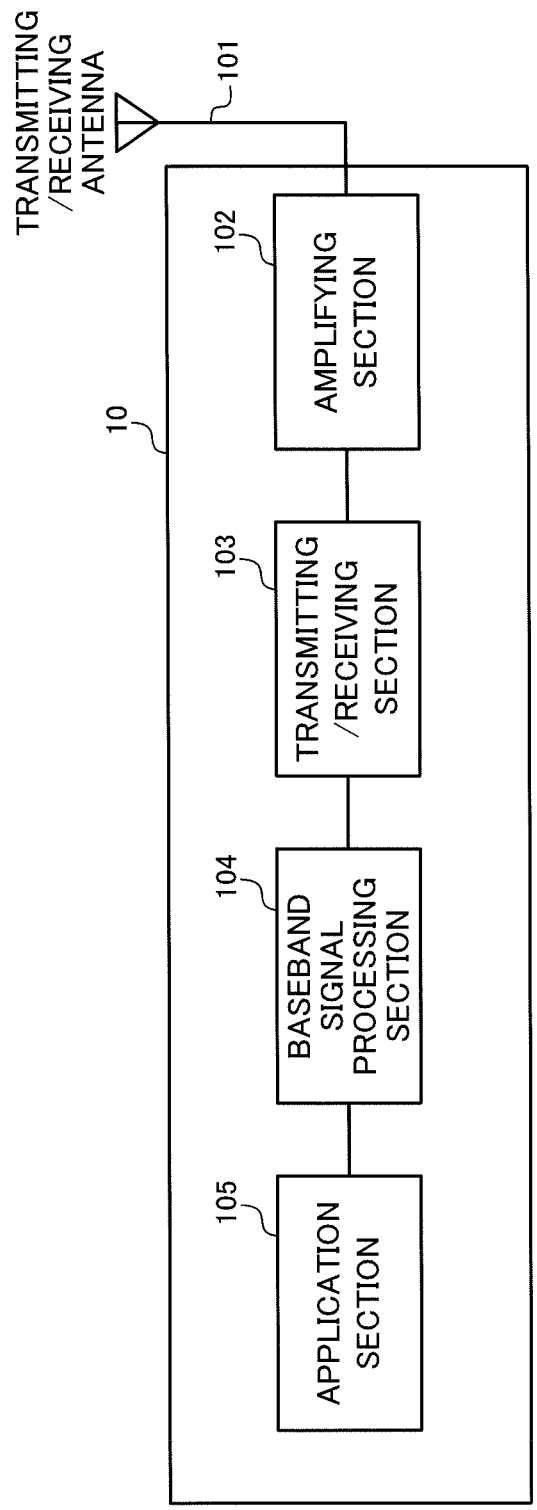
FIG. 11 is a diagram to explain an overall configuration of a user terminal.

Next, an overall configuration of a user terminal according to the present embodiment will be described with reference to FIG. 11. The user terminals $10_1$, $10_2$, and $10_3$ have the same configuration and therefore will be described simply as "user terminal 10." An LTE terminal and an LTE-A terminal have the same hardware configurations in principle parts, and therefore will be described indiscriminately. A user terminal 10 has a transmitting/receiving antenna 101, an amplifying section 102, a transmitting/receiving section (transmitting section/receiving section) 103, a baseband signal processing section 104, and an application section 105.

As for downlink data, a radio frequency signal that is received in the transmitting/receiving antenna 101 is amplified in the amplifying section 102, and converted into a baseband signal through frequency conversion in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes and so on related to higher layers above the physical layer and the MAC layer. In the downlink data, broadcast information is also transferred to the application section 105.

Uplink transmission data is input from the application section 105 into the baseband signal processing section 104. The baseband signal processing section 104 performs a mapping process, a transmission process of retransmission control (HARQ), channel coding, a DFT (Discrete Fourier Transform) process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 12:
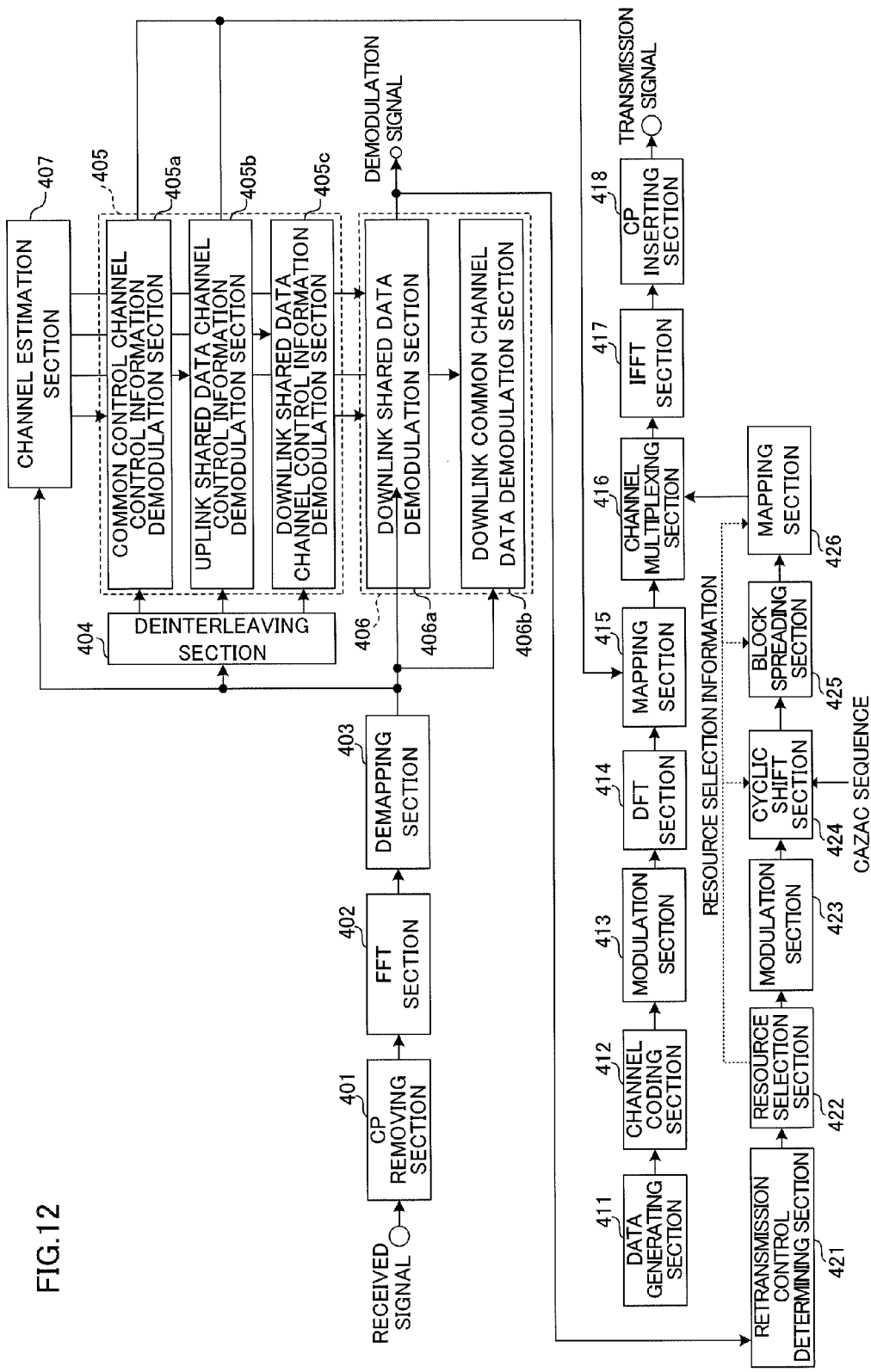
FIG. 12 is a functional block diagram corresponding to a baseband processing section of a user terminal.

FIG. 12 is a functional block diagram of the baseband signal processing section 104 provided in the user terminal 10, and shows function blocks of an LTE-A terminal which supports LTE-A.

A downlink signal that is received from the radio base station 20 as received data has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal, and inputs this signal in a demapping section 403.

The demapping sections 403 demaps the downlink signal, and extracts, from the downlink signal, multiplex control information in which a plurality of pieces of control information are multiplexed, user data, and higher control signals. Note that the demapping process by the demapping section 403 is performed based on higher control signals that are received as input from the application section 105. The multiplex control information that is output from the demapping section 403 is deinterleaved in a deinterleaving section 404.

The baseband signal processing section 104 has a control information demodulation section 405 that demodulates control information, a data demodulation section 406 that demodulates downlink shared data, and a channel estimation section 407. The control information demodulation section 405 has a shared control channel control information demodulation section 405a that demodulates downlink shared control channel control information from the multiplex control information, an uplink shared data channel control information demodulation section 405b that demodulates uplink shared data channel control information from the multiplex control information, and a downlink shared data channel control information demodulation section 405c that demodulates downlink shared data channel control information from the multiplex control information. The data demodulation section 406 includes a downlink shared data demodulation section 406a that demodulates user data and higher control signals, and a downlink shared channel data demodulation section 406b that demodulates downlink shared channel data.

The shared control channel control information demodulation section 405a extracts shared control channel control information, which is control information that is common between users, by, for example, performing a blind decoding process, a demodulation process, a channel decoding process and so on of the common search spaces of the downlink control channel (PDCCH). The shared control channel control information includes downlink channel quality information (CQI), and is input in a mapping section 415 and mapped as a part of transmission data for the radio base station 20.

The uplink shared data channel control information demodulation section 405b extracts uplink shared data channel control information (for example, UL grants), by, for example, performing a blind decoding process, a demodulation process, and a channel decoding process and so on of the user-specific search spaces of the downlink control channel (PDCCH). The demodulated uplink shared data channel control information is input in the mapping section 415 and is used to control the uplink shared data channel (PUSCH).

The downlink shared data channel control information demodulation section 405c extracts user-specific downlink shared data channel control information (for example, DL assignments) by, for example, performing a blind decoding process, a demodulation process, a channel decoding process and so on of the user-specific search spaces of the downlink control channel (PDCCH). The demodulated downlink shared data channel control information is input in the downlink shared data demodulation section 406a, is used to control the downlink shared data channel (PDSCH), and is input in the downlink shared data demodulating section 406a.

The downlink shared data demodulation section 406a acquires user data and higher control information based on the downlink shared data channel control information that is input from the downlink shared data channel control information demodulation section 405c. The downlink shared channel data demodulation section 406b demodulates the downlink shared channel data based on the uplink shared data channel control information that is input from the uplink shared data channel control information demodulation section 405b.

The channel estimation section 407 performs channel estimation using user-specific reference signals (DM-RSs) or cell-specific reference signals (CRSs). In the event of demodulating the PDCCH, channel estimation is performed using the cell-specific reference signals. The estimated channel variation is output to the shared control channel control information demodulation section 405a, the uplink shared data channel control information demodulation section 405b, the downlink shared data channel control information demodulation section 405c, and the downlink shared data demodulation section 406a. In these demodulation sections, a demodulation process is performed using the estimated channel variation and the reference signals for demodulation.

The baseband signal processing section 104 has, as function blocks of the transmission processing sequence, a data generating section 411, a channel coding section 412, a modulation section 413, a DFT section 414, a mapping section 415, a channel multiplexing section 416, an IFFT section 417, and a CP inserting section 418. The baseband signal processing section 104 has, as function blocks of the transmission process sequence for the PUCCH, a retransmission control determining section 421, a resource selection section 422, a modulation section 423, a cyclic shift section 424, a block spreading section 425, and a mapping section 426.

The data generating section 411 generates transmission data from bit data that is input from the application section 105. The channel coding section 412 applies channel coding processes such as error correction to the transmission data, and the modulation section 413 modulates the transmission data after channel coding by QPSK and so on. The DFT section 414 performs a discrete Fourier transform of the modulated transmission data. The mapping section 415 maps each frequency component of the data symbols after the DFT to subcarrier positions designated by the radio base station 20. The mapping section 415 outputs the mapped signal to the channel multiplexing section 416.

The retransmission control determining section 421 determines the retransmission control for the downlink signals transmitted from each cell, and outputs retransmission control signals. When a plurality of CCs are allocated for communication with the radio base station, whether or not the PDSCH signal is received without error is determined on a per CC basis. The retransmission control determining section 421 outputs the retransmission control signals to the resource selection section 422. Note that a case is shown here where the retransmission control signals are transmitted by means of the PUCCH (that is, a case where there is no PUSCH signal in the transmitting subframe). When retransmission acknowledgement signals are included and transmitted in the PUSCH, the retransmission acknowledgement signals are multiplexed with the data signal.

The resource selection section 422 selects the PUCCH resources for feeding back the retransmission control signals. For example, when a user terminal receives downlink signals from P-Cell and S-Cell, the PUCCH resources to allocate the retransmission control signals corresponding to the downlink signals of P-Cell to and the PUCCH resources to allocate the retransmission control signals corresponding to the downlink signals of S-Cell to are determined separately. As has been described with the above embodiment, when the ratio of downlink subframes is higher in S-Cell than in P-Cell, the resource selection section 422 determines the PUCCH resources to allocate the retransmission control signals from P-Cell to, and the PUCCH resources to allocate the retransmission control signals from S-Cell to, by different methods, and distributes them so as not to overlap each other.

For example, when the ratio of downlink subframes is higher in S-Cell than in P-Cell, the resource selection section 422 determines the PUCCH resources to allocate the retransmission control signals corresponding to the downlink signals of P-Cell to (and of S-Cell, with user terminals of earlier versions than Rel. 11), by above equation 1. The PUCCH resources to allocate the retransmission control signals corresponding to the downlink signals of S-Cell to are determined using the methods described above with reference to the first example and the second example.

When the above first example is applied, the resource selection section 422 numbers the indices $m_S$ of the subframes to feed back the retransmission control signals from S-Cell taking into account the subframe indices $m_P$ of P-Cell (by applying the above-described requirements), and determines the PUCCH resources using above equation 2. When the above second example is applied, the resource selection section 422 selects the PUCCH resources to allocate the retransmission control signals from S-Cell to, from the region that is given by shifting the range, from which the PUCCH resources to allocate the retransmission control signals from P-Cell to are selected, at least more than the maximum value of control channel elements (CCEs), which provide the allocation unit of downlink control information (by applying above equation 3). Information about the PUCCH resources selected by the resource selection section 422 is reported to the modulation section 423, the cyclic shift section 424, the block spreading section 425 and the mapping section 426.

The modulation section 423 carries out phase modulation (PSK data modulation) based on the information reported from the resource selection section 422. The cyclic shift section 424 performs orthogonal-multiplexing using a cyclic shift of a CAZAC (Constant Amplitude Zero Auto Correlation) code sequence. Note that the amount of a cyclic shift varies per user terminal 10, and is associated with cyclic shift indices. The cyclic shift section 424 outputs the signals after the cyclic shift to a block spreading section (orthogonal code multiplying means) 425. The block spreading section 425 multiplies the reference signals after the cyclic shift by orthogonal code (that is, performs block spreading). Here, the OCC (block spreading code number) to use for the reference signals may be reported from a higher layer by RRC signaling and so on, or the OCC that is associated with the CS of the data symbols in advance may be used. The block spreading section 425 outputs the signals after the block spreading to the mapping section 426.

The mapping section 426 maps the signals after the block spreading to subcarriers based on information reported from the resource selection section 422. The mapping section 426 outputs the mapped signals to the channel multiplexing section 416. The channel multiplexing section 416 time-multiplexes the signals from the mapping sections 415 and 426, and provides transmission signals including uplink control channel signals. The IFFT section 417 performs an IFFT of the channel-multiplexed signals and converts them into time domain signals. The IFFT section 417 outputs the signals after the IFFT to the CP inserting section 418. The CP inserting section 418 adds CPs to the signals after the orthogonal code multiplication. Then, using an uplink channel, uplink transmission signals are transmitted to a radio communication apparatus.

Note that, although a case has been described with the above description where, when uplink control information is transmitted on the uplink from the user terminal 10, orthogonal-multiplexing is applied between users using a cyclic shift of a CAZAC code sequence and retransmission acknowledgement signals are fed back, this is by no means limiting.

An overall configuration of the radio base station according to the present embodiment will be described with reference to FIG. 13. The radio base station 20 has a transmitting/receiving antenna 201, an amplifying section 202, a transmitting/receiving section (transmitting section/receiving section) 203, a baseband signal processing section 204, a call processing section 205, and a transmission path interface 206. Transmission data to be transmitted from the radio base station 20 to the user terminal on the downlink is input from the higher station apparatus 30, into the baseband signal processing section 204, via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. A signal of a physical downlink control channel, which is a downlink control channel, is also subjected to transmission processes such as channel coding and an inverse fast Fourier transform.

The baseband signal processing section 204 reports control information for allowing each user terminal 10 to perform radio communication with the radio base station 20, to the user terminals 10 connected to the same cell, by a broadcast channel. The information for allowing communication in the cell includes, for example, the uplink or downlink system bandwidth, root sequence identification information (root sequence index) for generating random access preamble signals in the PRACH (Physical Random Access Channel), and so on.

The baseband signal that is output from the baseband signal processing section 204 is converted into a radio frequency band in the transmitting/receiving section 203. The amplifying section 202 amplifies the radio frequency signal having been subjected to frequency conversion, and outputs the result to the transmitting/receiving antennas 201.

Note that the transmitting/receiving section 203 transmits downlink signals including the PDCCH signal to the user terminals. When cross-carrier scheduling is executed between a plurality of CCs, the transmitting/receiving section 203 aggregates and allocates control information for receiving the downlink signals of each cell's CC in the downlink control channels of predetermined CCs, and transmits the control information.

As for signals to be transmitted from the user terminal 10 to the base station 20 on the uplink, a radio frequency signal that is received by the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT (Fast Fourier Transform) process, an IDFT (Inverse Discrete Fourier Transform) process, error correction decoding, a MAC retransmission control receiving process, and RLC layer and PDCP layer receiving processes, for the transmission data that is included in the baseband signal received on the uplink. The decoded signal is transferred to the higher station apparatus 30 via the transmission path interface 206.

The call processing section, 205 performs call processes such as setting up and releasing communication channels, manages the state of the radio base station 20, and manages the radio resources.

Figure 13:
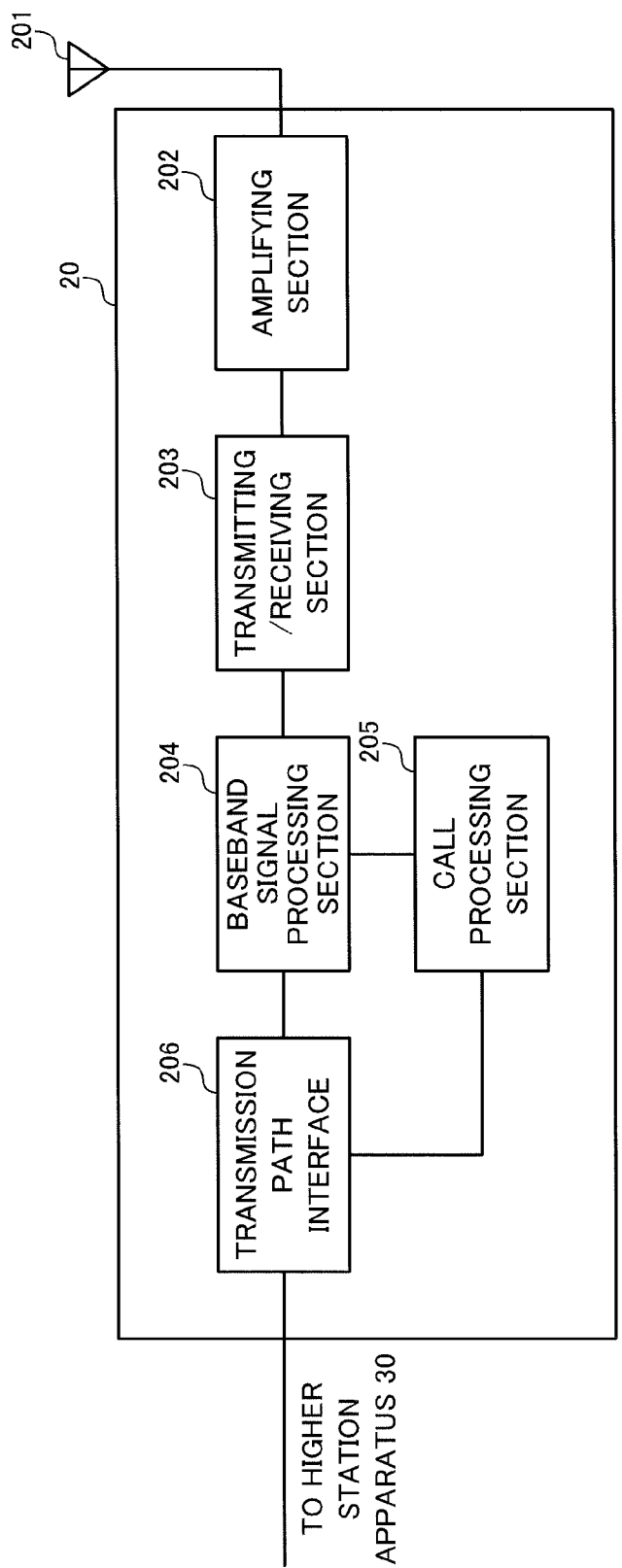
FIG. 13 is a diagram to explain an overall configuration of a radio base station.
Figure 14:
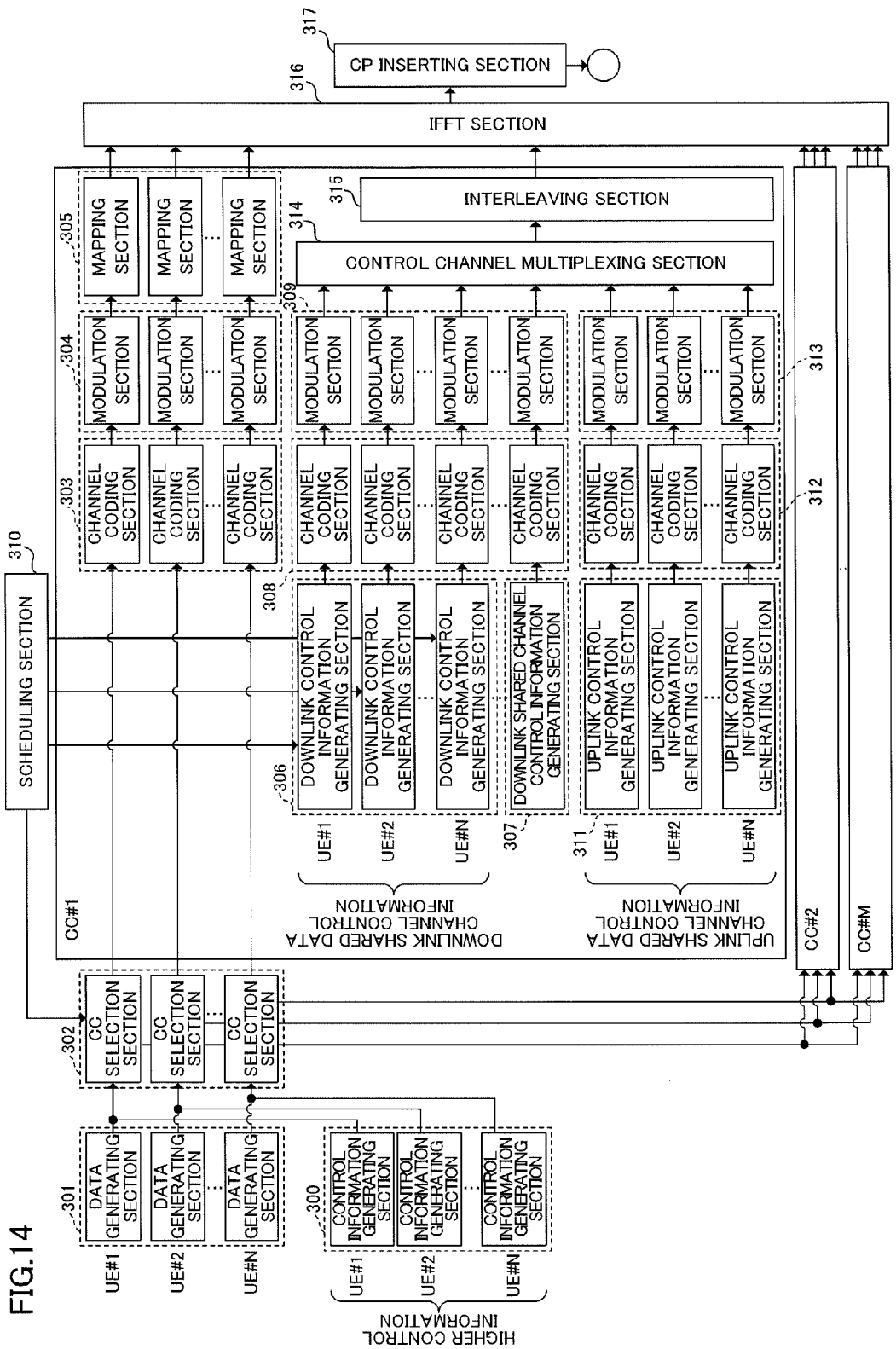
FIG. 14 is a functional block diagram corresponding to a baseband processing section of a radio base station.

FIG. 14 is a block diagram to show a configuration of a baseband signal processing section 204 in the radio base station shown in FIG. 13. The baseband signal processing section in FIG. 14 primarily shows the function blocks of a transmission processing section. FIG. 14 shows an example of a base station configuration which can support maximum M component carriers (CC #1 to CC #M). Transmission data for the user terminal 10 under the radio base station 20 is transferred from the higher station apparatus 30 to the radio base station 20.

Control information generating sections 300 generate higher control signals for higher layer signaling (for example, RRC signaling), on a per user basis. Data generating sections 301 output transmission data transferred from the higher station apparatus 30 as user data separately.

Component carrier selection sections 302 select the component carriers to be used for radio communication with the user terminals 10, on a per user basis. As described above, an addition/removal of component carriers is reported from the radio base station 20 to the user terminals 10 by RRC signaling.

The scheduling section 310 controls the allocation of component carriers to the user terminals 10 under control, according to the overall communication quality of the system band. The scheduling section 310 determines the addition/removal of component carriers to allocate for communication with the user terminals 10. A result determined in relation to the addition/removal of component carriers is reported to the control information generating sections 300.

The scheduling section 310 controls the allocation of resources in each component carrier CC #1 to CC #M. LTE terminal users and LTE-A terminal users are scheduled separately. The scheduling section 310 receives as input transmission data and retransmission commands from the higher station apparatus 30, and also receives as input the channel estimation values and resource block CQIs from the receiving section having measured the uplink signals.

The scheduling section 310 schedules the uplink/downlink control signals and the uplink/downlink shared channel signals with reference to the retransmission commands input from the higher station apparatus 30, the channel estimation values, and CQIs. The scheduling section 310 controls the retransmission of downlink signals based on the retransmission control signals fed back from the user terminals (that is, controls the control information generating section).

The baseband signal processing section 204 has channel coding sections 303, modulation sections 304, and mapping sections 305 to support the maximum number of users to be multiplexed, N, in one component carrier. The channel coding sections 303 perform channel coding of the shared data channel (PDSCH), formed with user data (including part of higher control signals) that is output from the data generating sections 301, on a per user basis. The modulation sections 304 modulate the user data having been subjected to channel coding, on a per user basis. The mapping sections 305 map the modulated user data to radio resources.

The baseband signal processing section 204 has downlink control information generating sections 306 that generate downlink shared data channel control information, which is user-specific downlink control information, and a downlink shared control channel control information generating section 307 that generates downlink shared channel control information, which is user-common downlink control information.

The downlink control information generating sections 306 generate downlink control information (DCI) from the resource allocation information, MCS information, HARQ information, PUCCH transmission power control command and so on, which are determined on a per user basis.

The baseband signal processing section 204 has channel coding sections 308 and modulation sections 309 to support the maximum number of users to be multiplexed, N, in one component carrier. The channel coding sections 308 perform channel coding of the control information generated in the downlink control information generating sections 306 and the downlink shared channel control information generating sections 307, on a per user basis. The modulation sections 309 modulate the downlink control information after channel coding.

The baseband signal processing section 204 has uplink control information generating sections 311 that generate uplink shared data channel control information, which is control information for controlling the uplink shared data channel (PUSCH), on a per user basis, channel coding sections 312 that perform channel coding of the generated uplink shared data channel control information, on a per user basis, and modulation sections 313 that modulate the uplink shared data channel control information having been subjected to channel coding, on a per user basis.

The control information that is modulated in the modulation sections 309 and 313 on a per user basis is multiplexed in the control channel multiplexing section 314, and furthermore interleaved in the interleaving section 315. A control signal that is output from the interleaving section 315 and user data that is output from the mapping sections 305 are input in the IFFT section 316 as downlink channel signals. The IFFT section 316 performs an inverse fast Fourier transform of the downlink channel signals and converts the frequency domain signals into time domain signals. A cyclic prefix (CP) inserting section 317 inserts cyclic prefixes in the time sequence signals of the downlink channel signals. Note that a cyclic prefix functions as a guard interval for cancelling the differences in multipath propagation delay. Transmission data, to which cyclic prefixes have been added, is transmitted to the transmitting/receiving section 203.

Although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-109983, filed on May 11, 2012, including the specification, drawings and abstract, is incorporated herein by reference in its entirety.

[Formula 1]

$$n_{PUCCH,i}^{(l)} = \begin{cases} (M_{PCell} - m - 1) \cdot N_c + m \cdot N_{c+1} + n_{CCE,m} + N_{PUCCH}^{(l)} & \text{if } m < M_{PCell} \\ (M_{SCell} - (m - M_{PCell}) - 1) \cdot N_c + (m - M_{PCell}) \cdot N_{c+1} + n_{CCE,m} + N_{PUCCH}^{(l)} + M_{PCell}N_4 & \text{if } m \geq M_{PCe} \end{cases}$$

$$N_c = \max\{0, \lfloor [N_{RB}^{DL} \times (N_{SC}^{RB} \times c - 4)]/36 \rfloor\}$$

(Equation 2)

The invention claimed is:

1. A user terminal that communicates with a radio base station by means of time division duplexing, in a communication band that is broadbanded by carrier aggregation between a first cell and a second cell, the user terminal comprising:

a receiving section that receives downlink control information for the first cell and downlink control information for the second cell, allocated to a downlink control channel of the first cell, by cross-carrier scheduling;

a retransmission control determining section that determines retransmission control for downlink signals transmitted from each cell;

a transmitting section that feeds back retransmission control signals to the radio base station using an uplink control channel of the first cell; and a resource selection section that selects resources for the uplink control channels to feed back the retransmission control signals, wherein, when a ratio of downlink subframes is higher in the second cell than in the first cell, the resource selection section determines the resources for the uplink control channel to allocate the retransmission control signals corresponding to the downlink signals of the first cell to, and the resources for the uplink control channel to allocate the retransmission control signals corresponding to the downlink signals of the second cell to, by different methods, so that these resources are distributed, when determining the resources for the unlink control channels to allocate the retransmission control signals to, using indices m of subframes to feed back the retransmission control signals, the resource selection section makes the indices m of subframes to transmit downlink signals in the first cell and in the second cell the same along a time axis direction, and makes the indices m of subframes to transmit downlink signals from the second cell alone be indices that do not overlap with the indices m assigned to the subframes of the first cell, and wherein the resource selection section selects the resources for the uplink control channel to allocate the retransmission control signals corresponding to the downlink signals of the second cell to, using following equation 2:

where:

c is a value selected from {0, 1, 2, 3} to fulfill $N_c \leq n_{CCE,m} \leq N_{c+1}$;

$N_{RB}^{DL}$ is the number of resource blocks on a downlink;

$N_{SC}^{RB}$ is the number of subcarriers per resource block in a frequency direction;

MPCell is the number of subframes to feed back retransmission control signals from P-Cell;

MSCell is the number of subframes to feed back retransmission control signals from S-Cell;

m is an index of a subframe to feed back retransmission control signals;

nCCE,m is a first CCE index to constitute downlink control information;

N(1)PUCCH is a parameter reported through higher layer signaling; and

N4 is a value given by substituting c=4 in the above equation to determine Nc.

2. A user terminal that communicates with a radio base station by means of time division duplexing, in a communication band that is broadbanded by carrier aggregation between a first cell and a second cell, the user terminal comprising:

a receiving section that receives downlink control information for the first cell and downlink control information for the second cell, allocated to a downlink control channel of the first cell, by cross-carrier scheduling;

a retransmission control determining section that determines retransmission control for downlink signals transmitted from each cell;

a transmitting section that feeds back retransmission control signals to the radio base station using an uplink control channel of the first cell; and a resource selection section that selects resources for the uplink control channels to feed back the retransmission control signals, wherein, when a ratio of downlink subframes is higher in the second cell than in the first cell, the resource selection section determines the resources for the uplink control channel to allocate the retransmission control signals corresponding to the downlink signals of the first cell to, and the resources for the uplink control channel to allocate the retransmission control signals corresponding to the downlink signals of the second cell to, by different methods, so that these resources are distributed, and the resource selection section selects the resources for the uplink control channel to allocate the retransmission control signals corresponding to the downlink signals of the second cell to, from a region at a shift from a range where the resources for the uplink control channel to allocate the retransmission control signals corresponding to the downlink signals of the first cell to are selected from, the shift being at least greater than a maximum value of control channel elements, which provide an allocation unit of downlink control information.

3. The user terminal according to claim 2, wherein the resource selection section selects the resources for the uplink control channel to allocate the retransmission control signals corresponding to the downlink signals of the second cell to, using following equation 3:

[Formula 2]

$$n_{PUCCH,i}^{(l)} = \quad \text{(Equation 3)}$$
$$(M_{SCell} - m - 1) \times N_c + m \times N_{c+1} + n_{CCE,m} + N_{PUCCH}^{(l)} + \Delta,$$
$$\Delta > n_{PUCCH\_max}^{(l)} = M_{PCell} \cdot N_4 + N_{PUCCH}^{(l)}$$
$$N_c = \max\{0, \lfloor [N_{RB}^{DL} \times (N_{SC}^{RB} \times c - 4)]/36 \rfloor\}$$

c: a value selected from {0, 1, 2, 3} to fulfill;
$N_{RB}^{DL}$: the number of resource blocks on the downlink;
$N_{SC}^{RB}$: the number of subcarriers per resource block in the frequency direction;
MPCell: the number of subframes to feed back retransmission control signals from P-Cell;
MSCell: the number of subframes to feed back retransmission control signals from S-Cell;
m: the index of a subframe to feed back retransmission control signals;
nCCE,m: the first CCE index to constitute downlink control information;
N(1)PUCCH: parameter reported through higher layer signaling; and
N4: the value given by substituting c=4 in the above equation to determine Nc.

4. The user terminal according to claim 2, wherein the resources for the uplink control channels selected by the resource selection section are resources in channel selection where an uplink control channel format 1b is applied.

5. The user terminal according to claim 2, wherein the first cell is a P-Cell (Primary-Cell) and the second cell is an S-Cell (Secondary-Cell).

6. A radio communication method for a radio base station and a user terminal that communicate by means of time division duplexing, in a communication band that is broadbanded by carrier aggregation between a first cell and a second cell, the radio communication method comprising the steps in which the user terminal:
receives downlink control information for the first cell and downlink control information for the second cell allocated to a downlink control channel of the first cell, by cross-carrier scheduling;
determines retransmission control for downlink signals transmitted from each cell;
selects resources for uplink control channels to feed back retransmission control signals; and
feeds back the retransmission control signals to the radio base station using the uplink control channel of the first cell,
wherein, when a ratio of downlink subframes is higher in the second cell than in the first cell, the resources for the uplink control channel to allocate the retransmission control signals corresponding to the downlink signals of the first cell to, and the resources for the uplink control channel to allocate the retransmission control signals corresponding to the downlink signals of the second cell to, are determined by different methods, so that these resources are distributed, and
the user terminal selects the resources for the unlink control channel to allocate the retransmission control signals corresponding to the downlink signals of the second cell to, from a region at a shift from a range where the resources for the uplink control channel to allocate the retransmission control signals corresponding to the downlink signals of the first cell to are selected from, the shift being at least greater than a maximum value of control channel elements, which provide an allocation unit of downlink control information.

7. A radio communication system comprising a user terminal that communicates with a radio base station by means of time division duplexing, in a communication band that is broadbanded by carrier aggregation between a first cell and a second cell, wherein:
the radio base station comprises:
a transmitting section that, by applying cross-carrier scheduling, allocates downlink control information for the first cell and downlink control information for the second cell to downlink control channels of the first cell, and transmits the downlink control information;
a receiving section that receives retransmission signals fed back from the user terminal; and
a retransmission control section that controls retransmission of downlink signals based on the received retransmission control signals;
the user terminal comprises:
a receiving section that receives the downlink control information for the first cell and the downlink control information for the second cell transmitted from the radio base station;
a retransmission control determining section that determines retransmission control for downlink signals transmitted from each cell;
a transmitting section that feeds back the retransmission signals to the radio base station using the uplink control channel of the first cell; and
a resource selection section that selects resources for the uplink control channels to feed back the transmission control signals,
wherein, when a ratio of downlink subframes is higher in the second cell than in the first cell, the resource selection section determines the resources for the uplink control channel to allocate the retransmission control signals corresponding to the downlink signals of the first cell to, and the resources for the uplink control channel to allocate the retransmission control signals corresponding to the downlink signals of the second cell to, by different methods, so that these resources are distributed, and
the resource selection section selects the resources for the uplink control channel to allocate the retransmission control signals corresponding to the downlink signals of the second cell to, from a region at a shift from a range where the resources for the uplink control channel to allocate the retransmission control signals corresponding to the downlink signals of the first cell to are selected from, the shift being at least greater than a maximum value of control channel elements, which provide an allocation unit of downlink control information.

* * * * *